United States Patent [19]

VanDerLinden et al.

[11] Patent Number: 4,515,028

[45] Date of Patent: May 7, 1985

[54] MULTI-SPEED DRIVE

[75] Inventors: Roy E. VanDerLinden, West Minster, Md.; John H. Francis, Charles Town, W. Va.

[73] Assignee: Frederick Manufacturing Company, Frederick, Md.

[21] Appl. No.: 480,144

[22] Filed: Mar. 29, 1983

Related U.S. Application Data

[63] Continuation-in-part of Ser. No. 426,875, Sep. 29, 1982.

[51] Int. Cl.$^3$ .................... F16H 15/00; F16H 15/16
[52] U.S. Cl. .................................. 74/191; 74/190
[58] Field of Search ............... 74/190, 191, 199, 200, 74/201, 798, 800

[56] References Cited

U.S. PATENT DOCUMENTS

| 20,461 | 6/1858 | Wilson | 74/798 |
|---|---|---|---|
| 37,165 | 12/1862 | Gary | 74/800 |
| 738,814 | 9/1903 | Kellogg | 74/190 |
| 840,202 | 1/1907 | Davis | 74/190 |
| 2,168,956 | 8/1939 | Kohl | 74/191 |
| 2,842,001 | 7/1958 | Hunting | 74/191 |
| 3,388,607 | 6/1968 | Stober et al. | 74/191 |
| 3,640,154 | 2/1972 | Massie | 74/800 |
| 4,466,303 | 8/1984 | Stober | 74/191 |

FOREIGN PATENT DOCUMENTS

| 464733 | 7/1972 | U.S.S.R. | 74/191 |
|---|---|---|---|

OTHER PUBLICATIONS

"10 Universal Shaft Couplings", pp. 326–327, *Mechanisms, Linkages and Mechanical Controls*, Federico Strasser, 1965.

*Primary Examiner*—Lawrence J. Staab
*Assistant Examiner*—Michael David Bednarek
*Attorney, Agent, or Firm*—Quaintance & Murphy

[57] ABSTRACT

A multi-speed drive has input and output shafts aligned on a first axis and connected to one another by a cone drive which has a plurality of conical surfaces sloped at various angles to form a "composite" cone. The composite cone is connected to the input shaft by a crank and rotates about a second axis which is oblique to, but intersects, the first axis at a point of intersection which is also a point of coincidence of the apexes of the conical surfaces. The composite cone rolls on one of a plurality of annular, conical surfaces, each of which is aligned with one of the conical surfaces on the cone. In accordance with the illustrated embodiment, all of the annular surfaces are free to rotate with respect to the composite cone, with the exception of the single annular surface that the composite cone rolls upon. This surface may be selected by stopping its rotation with a braking device, such as a pin or a prony brake. In the alternative, the conical annular surfaces may be slid axially in and out of engagement with their respective annular surfaces on the composite cone to select the desired output speed. A constant velocity joint connects the composite cone to the output shaft so as to transmit the rotation of the composite cone to the output shaft.

By selecting a single angle ($\gamma$) between the first and second axis, and by selecting appropriate angles ($\alpha$) for the conical surfaces, various output speeds and torques may be applied to the output shaft for a single input speed according to the ratio (R) wherein:

$$R = \frac{\cos(\alpha+\gamma)}{\cos\alpha - \cos(\alpha+\gamma)}$$

The aforedescribed multi-speed drive provides positive speed reductions and negative speed reductions. In addition, it provides "overdrive", direct drive, "park" and neutral modes of operation.

10 Claims, 5 Drawing Figures

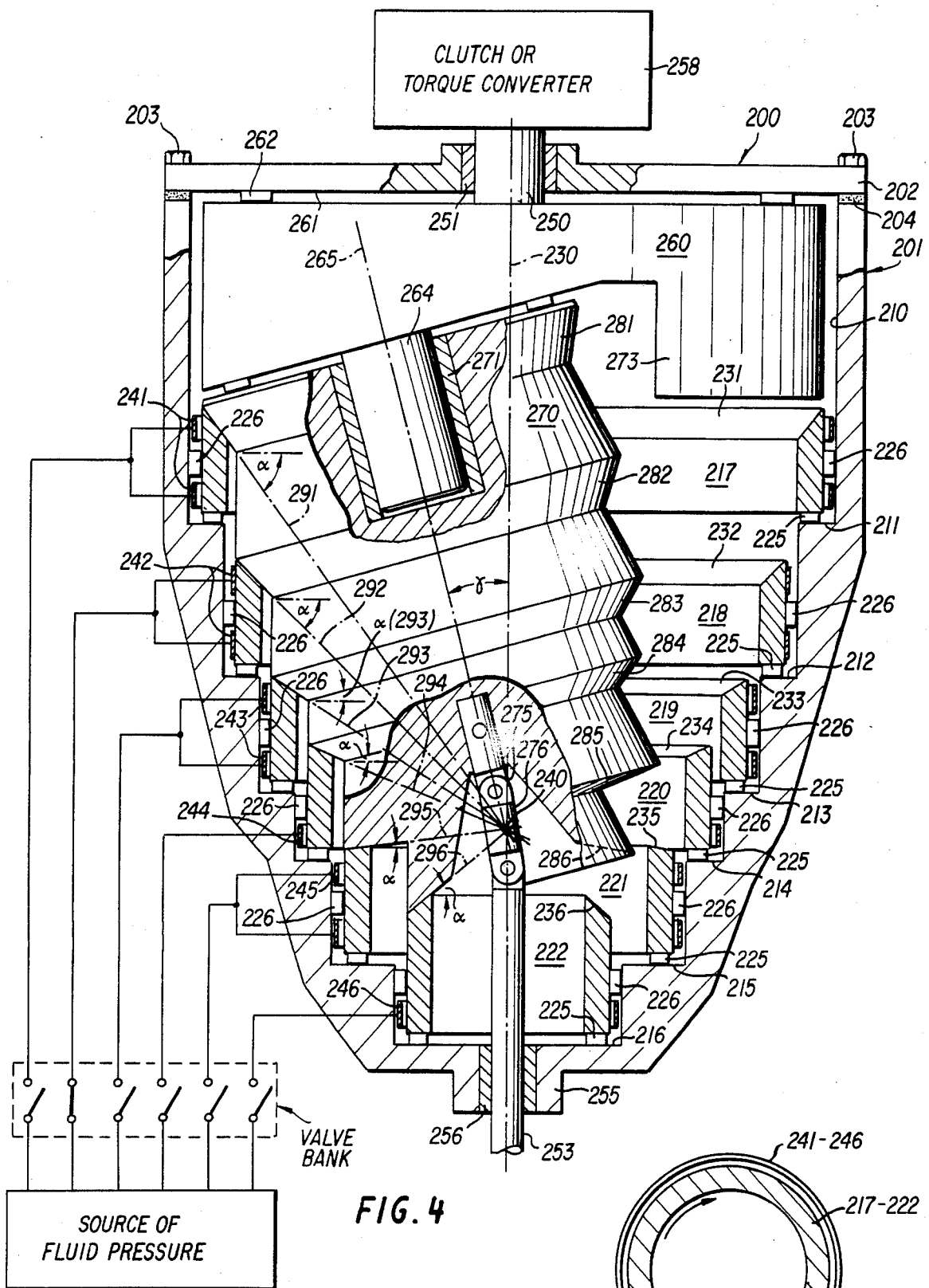
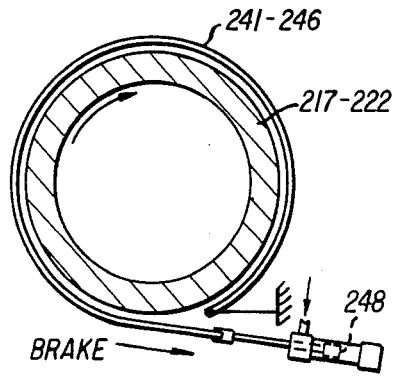
FIG. 4
FIG. 5

MULTI-SPEED DRIVE

RELATED APPLICATION

This application is a continuation-in-part of U.S. patent application Ser. No. 426,875 filed Sept. 29, 1982.

BACKGROUND OF THE INVENTION

1. Field of the Invention

The instant invention relates to multi-speed drives utilizing conical surfaces. More particularly, the instant invention relates to multi-speed drives utilizing opposed conical surfaces which are selectively engaged to vary output torque, output speed and output direction.

2. Technical Considerations and Prior Art

Most multi-speed drive mechanisms utilize a train of gears, an arrangement of belts and pulleys, or perhaps chains and sprockets. Since these mechanisms have many, well recognized drawbacks considerable effort has been expended over the years to improve them.

Considering gear drives first, gear drives necessarily involve sliding motion and therefore require lubrication. In addition, gear drives are noisy. Moreover precision gears are relatively expensive to manufacture and engineer due to their complex shape and due to the machining necessary for production. If a gear drive is utilized in a situation where it is desirable to limit torque, then a torque-limiting coupling or clutch must be used in combination with the drive. While it is possible to obtain a constant average torque output from a gear drive, there are always undulations in the output due to sliding action between the meshing gear teeth.

Most automotive gear drives are only about seventy five percent efficient in transmitting energy. While special drives having an efficiency on the order of ninety-five percent are available, they are very expensive and are generally not used for automotive applications. Furthermore, most automotive gear drives tend to be relatively heavy and consume considerable space. In automotive or vehicular applications, the relatively low efficiency of gear boxes, as well as their weight and size, results in design constraints which reduce overall efficiency and increase costs. In addition, in vehicles having a standard transmission, synchromeshing mechanisms are usually employed at extra cost and weight to insure smooth shifting. After a selected number of miles, the gear oil lubricant necessary to lubricate standard transmissions must be changed and used oil disposed of, which results in additional irritation and cost.

In many automotive applications, automatic transmissions utilizing fluid drives are now widely used as alternatives to gear boxes in order to spare the operator the inconvenience of manually shifting gears. However, the automatic transmissions currently on the market tend to be relatively expensive and are considerably less efficient than other gear boxes.

While transmissions which utilize belts and pulleys do not require lubrication, there is a tendency for the belts to stretch, slip and degrade due to friction between belts and pulleys. If the belts ride in grooves in the periphery of the pulleys, there is necessarily sliding contact between belts and grooves. Generally, belt transmissions have relatively limited longevity and reliability.

Chain and sprocket transmissions are perhaps a bit more predictable than belt transmissions; however, chain and sprocket transmissions require lubrication and are relatively noisy. Since they are not inherently torque-limiting, other mechanisms must be utilized if a torque-limiting feature is desired. Moreover, chain and sprocket mechanisms are relatively expensive to manufacture and are relatively inefficient.

In the past, in automotive applications, belts and pulleys and chains and sprockets have not been considered to be particularly desirable, and, in most applications, gear drives or fluid drives have been utilized. While belt drives may soon appear in the marketplace, they are still subject to the aforementioned limitations.

Friction drives which utilize cones have been experimented with for many years; however, cone drives have never been of great commercial significance because they wear quickly. Moreover, cone drives generally experience slippage which reduces their efficiency. Exemplary of a drive which utilizes conical surfaces is the drive of U.S. Pat. No. 4,161,890 in which a cone rotates on a stationary surface. However, the stationary surface is generally parallel to the axis of the cone, instead of being oriented at an angle thereto. Consequently, no appreciable torque escalation is accomplished. Moreover, the drive is essentially a friction drive with all of the drawbacks that usually accompany friction drives.

In view of the aforementioned considerations, there is a need for a new and improved multi-speed drive.

SUMMARY OF THE INVENTION

It is a feature of the instant invention to provide a new and improved multi-speed drive wherein the drive is highly efficient, inexpensive, minimal in weight and size, requires minimal lubrication, and is inexpensive to manufacture.

In view of these features and other features, the instant invention contemplates a new and improved multi-speed drive which utilizes a new and improved torque transmission and speed reduction mechanism. Moreover, the instant invention further contemplates a torque transmission and speed reduction mechanism which may have a single output speed, torque and direction for a particular input speed, torque and direction.

Such a torque transmission mechanism includes an input shaft which is mounted in a frame for rotation about a first axis. A first member is disposed around the first axis in the frame and has a first conical surface generated around the first axis. The first conical surface has an apex which is coincident with the first axis. A second member is disposed within the frame for rotation and revolution therein. The second member has a second conical surface in engagement with the first conical surface along a line of contact which intersects the first axis at a point that is coincident with the apex of both the first conical surface and second conical surface. The second member rotates about a second axis which is oblique with respect to the first axis and is also coincident with the apexes of the first and second conical surfaces and the point of intersection of the apexes and first axis. An output shaft is rotatably mounted in the frame to rotate about the first axis and is connected to the second member by a constant velocity joint, which is attached to the output shaft at a point coincident with the first axis and is attached to the second member at a point coincident with the second axis. The torque, speed and direction of rotation of the output shaft varies with respect to the torque, speed and direction of rotation of the input shaft in accordance with the angle that the line of contact between the conical surfaces makes with the first and second axes. Accordingly, the output shaft can rotate in the opposite direction of the input shaft, in the same direction, or, not rotate at all with respect to the input shaft. Moreover, the output torque may be increased drastically with respect to the input torque with a concurrent decrease in output speed, or the output torque and speed may be substantially equal to the input torque or speed. If desired, an "overdrive" situation may be achieved wherein the output speed is in excess of the input speed with a concurrent decrease in output torque with respect to input torque.

In order to have a multi-speed transmission utilizing the aforedescribed torque transmission mechanism, the first member may be configured as a composite cone having a plurality of conical surfaces in an annular arrangement about the second member. The apexes of the conical surfaces are coincident, and the point of coincidence lies on the first axis. The second member has a plurality of conical surfaces which engage the conical surfaces of the first member along lines of contact which, when extended, also intersect the apexes of the first conical surfaces and the first axis. By selectively locking or engaging single first members against rotation; output torque, speed and direction may be selected. By varying the force between the first and second conical surfaces, a torque limit for the multi-speed drive may be established.

The instant invention further contemplates utilizing non-rotatable, axially-shiftable first members in lieu of rotatable first members wherein the axially-shiftable members are individually brought into engagement with the corresponding surface on the composite cone in order to select a desired output speed.

The aforedescribed multi-speed drive is particularly suitable as a transmission in automotive vehicles due to its high efficiency (approximately 98%), its minimal weight and size, and its relatively low cost. Moreover, the output torque, speed and direction may be selected manually or automatically, depending on whether the input power is first passed through a manual clutch or torque converter.

BRIEF DESCRIPTION OF THE DRAWINGS

FIG. 4 is a side view, partially in section, showing another configuration of a multi-speed drive utilizing a composite cone member wherein an overdrive, "direct drive", two forward reduced speeds, a park, a reverse and a neutral condition are embodied in the same transmission.

FIG. 5 is a top view of a single annular member and associated prony brake.

DESCRIPTION OF THE PREFERRED EMBODIMENTS

Figure 1:
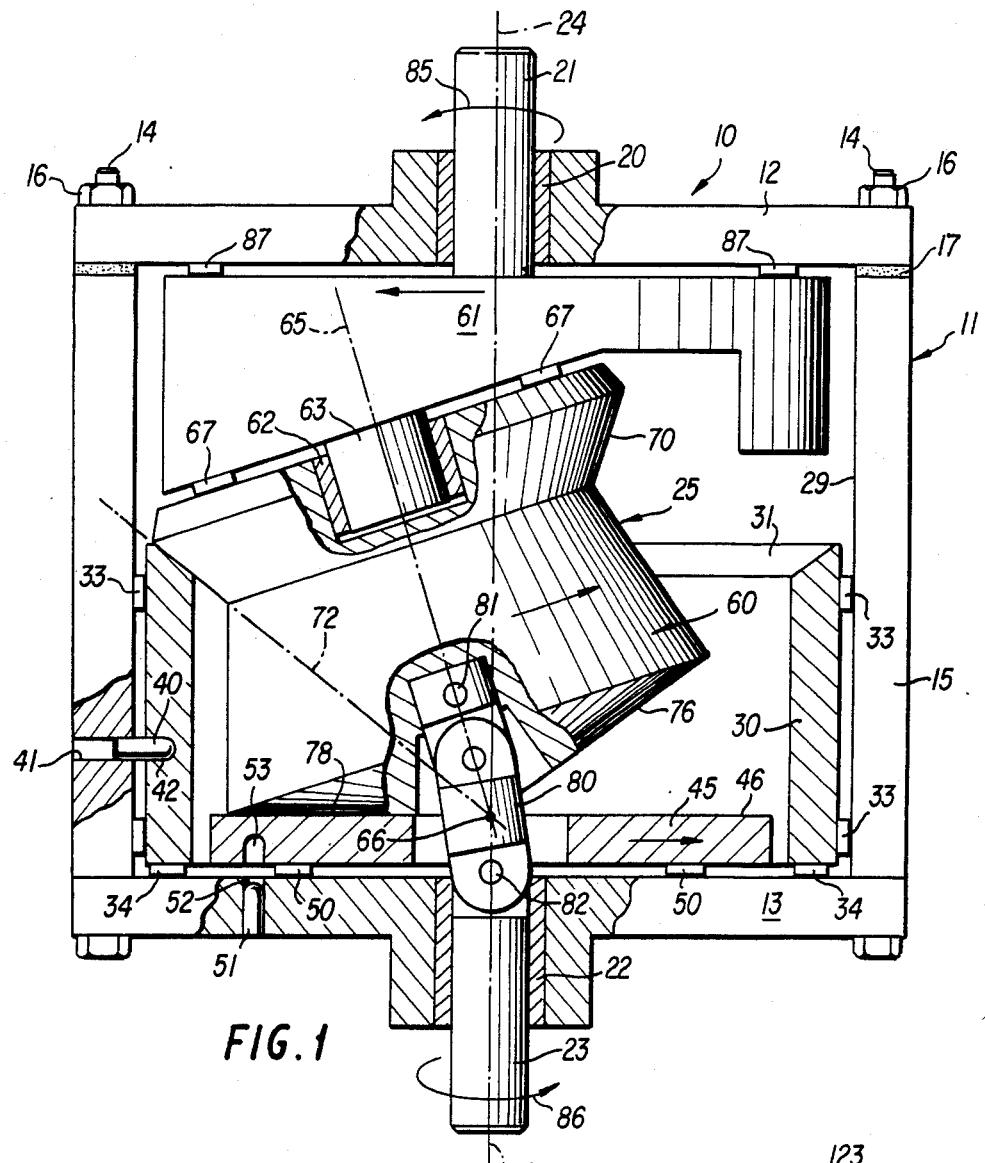
FIG. 1 is a side view, partially in section, of one example of a multi-speed drive configured in accordance with the principles of the instant invention.

Referring now to FIG. 1, there is shown one example of a multi-speed drive, designated generally by the numeral 10, configured in accordance with the principles of the instant invention. The multi-speed drive 10 includes a frame or housing, designated generally by the numeral 11, which comprises a first end plate 12, which is joined to a second end plate 13 by a plurality of bolts 14 which pass through a cylindrical member 15. Nuts 16 are threaded on the bolts 14 to hold the frame or housing 11 assembled. A compressable member 17 is disposed between the cylindrical member 15 and first end plate 12.

The first end plate 12 has a bearing 20 therein in which an input shaft 21 is journalled. The second end plate 13 has a bearing 22 in which an output shaft 23 is journalled. The input shaft 21 and the output shaft 23 are aligned with one another to rotate about the same longitudinal axis 24. The input shaft 21 is coupled to the output shaft 23 by a cone drive, designated generally by the numeral 25, which determines the speed, torque and direction of the output shaft 23 with respect to the speed, torque and direction of the input shaft 21. By tightening or loosening the nuts 16 on the threaded bolts 14, the torque limit of the drive 10 may be adjusted.

Considering the cone drive 25 specifically, the cone drive comprises a first annular member 30 which includes an annular conical surface 31. The first annular member 30 is mounted for rotation on inner wall 29 of the cylindrical member 15 and on the inside surface of the second end plate 13 by roller bearings 33, disposed between the first member and wall, and by thrust bearings 34, disposed between the inside surface of the second end plate and the first annular member. The first annular member can be selectively fixed or grounded with respect to the frame or housing 11 by some type of stop or braking device. In FIG. 1, the braking device is a pin 40 which extends through a bore 41 in the cylindrical member 15 and into a bore 42 in the first annular member 30. As will be explained hereinafter, when the pin 40 is seated within the bore 42, the first annular member 30 determines the output speed of the output shaft 23. When the pin 40 is withdrawn from the bore 42, the first annular member 30 has no effect on the speed of the output shaft 23.

Also mounted within the housing 11 is a first annular plate 45, which has a "conical" surface 46 thereon, which conical surface 46 may be, for all practical purposes, "flat" and is, therefore, a special case for a conical surface wherein the angle of the conical surface with respect to the "base" of the cone is 0. This conical surface corresponds to the flat surface in co-pending application Ser. No. 426,875 filed Sept. 29, 1982, which application is herein incorporated by reference. The first annular plate 45 is free to rotate on thrust bearings 50 disposed between the second end plate 13 and the second annular member. If one desires to select the particular speed determined by surface 46, then a stop pin 51 mounted in bore 52 of the second end plate 13 may be projected into a bore 53 in the second annular plate 45, thus preventing its rotation. When the second annular member 46 is prevented from rotating, then the first annular member 30 must be free to rotate in order to have the output torque and speed on the output shaft 23 determined by the first annular plate 45.

A composite conical member, also referred to as the second member, 60 is mounted within the housing 11 on a crank arm 61 which crank arm is fixed to the input shaft 21. A bearing 62 journals the composite conical member 60 on a shaft 63 fixed to the crank arm. The shaft 63 is aligned with a second longitudinal axis 65 which intersects the first longitudinal axis 24 at a point 66. The composite conical member 60 is, therefore, rotatable about the second axis 65 as the conical member revolves about the first axis 24. A thrust bearing 67 is disposed between the composite conical member 60 and the crank arm 61. The conical member 60 has a conical surface 70 thereon which engages the conical surface 31 of the first annular member 30 in line contact along line 72. Line 72, when extended, intersects point 66, so that the apexes of the conical surfaces 31 and 70 are both coincident at the point 66 which is also coincident with first axis 24 and second axis 65.

When pin 51 unlocks and pin 40 locks an annular member 30 against rotation, the conical member 60 rolls with progressive line contact and, ideally, with no substantial sliding motion on conical surface 31.

The composite conical member 60 has another conical surface 76 thereon which engages surface 46 on the annular member 45 on a line contact along line 78. The line 78 also passes through point 66 when extended so that it is coincident with the apexes of conical surfaces 31 and 72 and with the point of intersection of the first axis 24 and second axis 65. When the first annular plate 45 is locked with pin 51, and pin 42 is withdrawn from the first annular member 30, then the conical member 60 rolls on surface 46 of the second annular member 45 as the input shaft 21 rotates.

The conical member 60 will rotate at one speed with respect to the crank 61 and crank pin 63 when it is rolling on conical surface 31 and at another, slower, speed when it is rolling on conical surface 46. In order to transmit the selected speed to the output shaft 23, a constant velocity joint, designated generally by the numeral 80, is connected to the conical member 60 and the output shaft 23 by pins 81 and 82, respectively. The pin 81 intersects the second axis 65, while the pin 82 intersects the first axis 24. The point of coincidence 66 lies within the constant velocity joint 80, and the constant velocity joint 80 revolves around the point 66. Since the output shaft 23 is restrained to purely rotational motion by bearing 22, the wobbling motion in the constant velocity joint 80 is converted to pure rotation by the output shaft 23.

In the embodiment shown in FIG. 1, the cone drive 25 converts input rotation and torque on the input shaft 21 (exemplified by the arrow 85) to output rotation and torque on output shaft 23 (exemplified by the arrow 86). In the embodiment illustrated in FIG. 1, the cone drive 25 both reverses the direction of rotation and increases the output torque on output shaft 23 with respect to the input on shaft 21, while reducing the speed on output shaft with respect to input shaft. This is so for the speed determined by surface 31 on annular member 30 and the speed determined by surface 46 on the annular member 45.

The crank 61 is supported against the first end plate 12 by thrust bearings 87. In order to select the torque at which the multi-speed drive 10 will slip, the force with which the crank 61 is urged against the bearings 87 can be selected by tightening or loosening the nuts 16 on the bolts 14. Consequently, the multi-speed drive 10 also serves as a torque-limiting device which will protect both a driving mechanism (not shown) connected to input shaft 21 and a driven mechanism (not shown) connected to output shaft 23.

Figure 2:
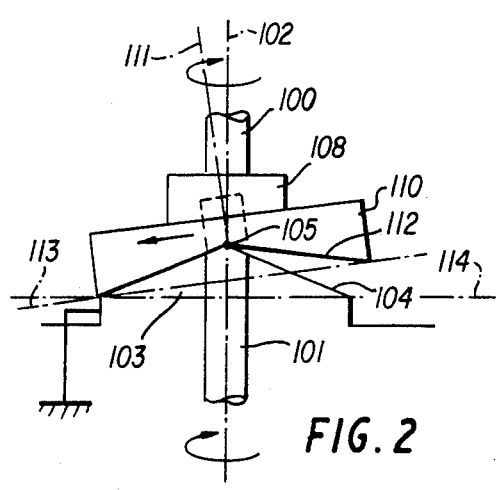
FIG. 2 is a side schematic view illustrating one particular case of the type of device shown in FIG. 1, wherein engaged conical surfaces are configured so that the output shaft rotates in the same direction as the input shaft.
Figure 3:
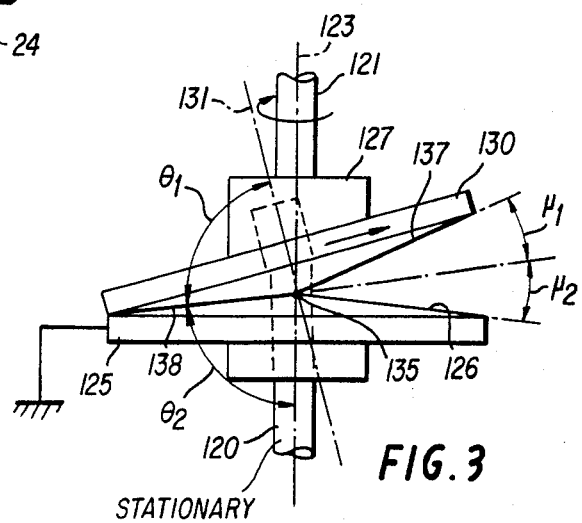
FIG. 3 is a side view illustrating a particular orientation of conical surfaces wherein the output shaft has no rotation and torque with respect to ground, while the input shaft continues to rotate and, thus, illustrates an orientation of conical surfaces resulting in a "park" condition.

Referring now to FIGS. 2 and 3, which are special cases and can be achieved by particular orientations of the conical surfaces, it is seen that a reverse in rotational direction from the example of FIG. 1 can be obtained if the surfaces are disposed as in FIG. 2, and a "park" configuraton can be obtained if the surfaces are disposed as in the embodiment of FIG. 3.

Considering FIG. 2, specifically, it is seen that an input shaft 100 and an output shaft 101 are aligned with and rotate about a first axis 102. A first conical member 103 is disposed around the axis 102 and is fixed with respect to the axis 102 and output shaft 101. The first conical member 103 has a conical surface 104 thereon having an apex which intersects the first axis 102 at a point 105. The input shaft 100 has a crank arm 108 fixed thereto to rotate therewith. The crank arm 108 has a second conical member 110 journalled to rotate with respect thereto about a second axis 111 which intersects the point 105. The second conical member 110 has a conical surface 112 thereon which is concave with respect to an imaginary baseline 113, whereas the conical surface 104 on the first and sixth conical member 103 is convex with respect to its imaginary baseline 114. The concave surface 112 also has an apex which is coincident with point 105. With the particular arrangement shown in FIG. 2, input shaft 100 and output shaft 101 rotate in the same direction. Consequently, if one were to include conical surfaces oriented in a manner similar to the surfaces 104 and 112 of FIG. 2 in the multi-speed device of FIG. 1, a reverse operation would be achievable (the reverse situation of FIG. 1 being where the output shaft 23 rotates in the same direction, as opposed to the opposite direction, of input shaft 21).

Referring now to FIG. 3, an output shaft 120 is fixed or locked with respect to "ground" as the input shaft 121 rotates. This results in a condition in which the transmission is in a "park" configuration. In the special condition shown in FIG. 3, the output shaft 120 and input shaft 121 are again aligned with respect to a first axis 123. A fixed first member 125 having a first conical surface 126 thereon is disposed about the first axis 123. A crank arm 127 is fixed to the input arm 121 to rotate therewith. A second conical member 130 is journalled on the crank arm 127 to rotate about a second axis 131 which intersects the first axis 123 at a point 135. The point 135 is also the ape of conical surface 126. The second conical member 130 has a conical surface 137 thereon which engages the conical surface 126 in line contact along line 138. Both the line 138 and the apexes of the conical surface 137 are coincident at point 135.

It is seen from FIG. 3 that the conical surfaces 126 and 137 are oriented at an angle between the situations shown in FIG. 1, wherein the output and input shafts have opposite directions of rotations, and the situation shown in FIG. 2, wherein the output and input shafts have the same direction of rotation. Note in FIG. 3 that angle $\theta_1$ is equal to angle $\theta_2$ and that angle $\mu_1$ is equal to angle $\mu_2$. By selecting the angle of inclination so that the conical member 130 rotates at the same speed as the input shaft 121, but in the opposite direction, both the torque and rotation of input shaft 121 are cancelled. Consequently, there is no output on output shaft 120. In addition, output shaft 120 is held locked with respect to ground so that the "park" condition results. If, for example, the particular configuration of conical surfaces shown in FIG. 3 is used in an automotive transmission, driving wheels (not shown), driven by the output shaft 120, will remain stationary and locked while the engine (not shown) driving the input shaft 121 rotates.

Referring now to FIG. 4, a multi-speed drive, designated generally by the numeral 200, is shown which embodies the concepts illustrated in FIGS. 1, 2 and 3 in a single unit. The multi-speed drive 200 is illustrative of a multi-speed drive or transmission particularly suitable for an automotive vehicle in that the multi-speed drive has a direct drive, an overdrive, two reduced speeds, a park, a neutral, and a reduced reverse speed.

Considering the structure specifically, the transmission includes a housing, designated generally by the numeral 201, which functions as a supporting frame or "ground" for the moving components in the transmission. The housing 201 has an end plate 202 which is secured thereto by a plurality of bolts 203. By tightening or loosening the bolts 203, the torque limit of the drive may be selected. A compressable member 204 is disposed between housing 201 and end plate 202.

The housing 201 has an interior surface 210 which includes stepped lands 211, 212, 213, 214, 215, and 216 First annular members 217, 218, 219, 220, 221 and 222 are supported on the lands 211, 212, 213, 214, 215 and 216, respectively. Each of the annular members 217–222 are mounted for rotation on their respective lands 211–216 by thrust bearings 225, which are disposed between the annular members and lands, and by roller bearings 226, which are disposed between the first annular members and side wall 210 of the housing 201.

The annular members 217–222 are coaxial with respect to a first axis 230 which extends longitudinally through the variable speed drive 200. The annular members 217–222 have conical surfaces 231–236 disposed thereon, each of which has an apex which is coincident at a point 240, which point intersects the first axis or longitudinal axis 230 of the multi-speed drive 200.

The first annular members 217–222 are selectively braked by prony brakes 241–246 in order to select the desired output speed, as will be explained hereinafter. The prony brakes 241–246 are split to accomodate the bearings 226 and have one end grounded to the housing as shown in FIG. 5. As is shown in FIG. 5, the other end of each of the prony brakes 241–246 is secured to a hydraulic actuator 248 which, when pressurized, tightens the brake about its respective first annular member (217–222). As will be explained hereinafter, by activating a single one of the prony brakes 241–246, one of the annular members 217–222 will be grounded with respect to the housing 201, thereby selecting the desired output speed for the multi-speed drive 200.

An input shaft 250 is journalled by a bearing 251 in the end plate 202 of the housing 201, while an output shaft 253 is journalled in the opposite end 255 of the housing by a bearing 256. The input shaft 250 and output shaft 253 are both aligned with the longitudinal axis 230 of the multi-speed drive 200.

The input shaft 250 is driven by an engine or motor (not shown) through a clutch or torque converter 258 and is fixed to a wobble arm or crank arm 260 within the housing 201. The wobble arm or crank arm 260 has an end surface 261 which rolls on thrust bearings 262 disposed between the top surface 261 and the end plate 202. A shaft 264 projects from the crank arm 260 along a second axis 265, which is oblique to the first axis 230, and intersects the first axis 230 at the point of intersection 240, which is also the coincident point for the apexes of conical surfaces 231–236 of the first annular members 217–222. A second member in the form of a composite cone 270 is journalled on the shaft 264 by bearing 271 for rotation about the second axis 265 at an angle "γ" with respect to the first axis 230, which is the longitudinal axis of the variable speed drive 200. In order to balance the system consisting of the crank 260 and composite cone 270, a counterweight 273 is mounted on the crank arm 260 at a position displaced approximately 180° from the shaft 264.

The composite cone 270 has a constant velocity joint 275 secured at the other end thereof at a point in alignment with the second axis 265. The constant velocity joint 275 includes a link 276 which is secured to the output shaft 253. The point of coincidence 240 falls within the link 276, and the link 276 revolves about the point of coincidence as input shaft 250 rotates the crank arm 260 and revolves with the composite cone 270. As the constant velocity joint 275 is rotated and revolves, it, in turn, drives the output shaft 253 to rotate about the first axis 230.

In order for torque to be transmitted through the composite cone 270, the composite cone 270 must be made to rotate about the second axis 265 as it revolves about the first axis 230. This is accomplished by providing the composite cone 270 with a plurality of second conical surfaces 281–286 which engage the conical surfaces 231–236 on the rings 217–222 with straight-line contact along lines of contact 291–296. The lines 291–296 lie within the first conical surfaces 231–236 and the second conical surfaces 281–286 and are, therefore, also coincident at point 240, which is also the point of intersection of the second axis 265 with the first axis 230.

The speed at which composite cone 270 rotates and its direction are determined by selecting one of the second conical surfaces 281–286, then rolling the composite cone 270 on that surface. This selection is accomplished by selecting the appropriate one of the first conical surfaces 231–236 and grounding or locking that surface against rotation with respect to the housing 201 by activating the appropriate and normally disengaged prony brake 241–246.

Considering the specific input-output ratios individually, overdrive is selected by locking the annular member 217 with respect to the housing by activating brake 241 so that the first conical surface 231 is grounded with respect to the housing, and the composite cone 270 rolls second conical surface 281 on first conical surface 231. In this condition, the output shaft 253 rotates in the opposite direction and at a higher speed, but with lower torque than the input shaft 250. This corresponds to an "overdrive" condition in a vehicle. The other prony brakes 242–246 are disengaged so that the remaining annular members 218–222 are free to rotate on the bearings 225 and 226.

Upon activating the annular brake 242 to stop the rotation of annular member 218, the composite cone 270 rolls second conical surface 282 on first conical surface 232, which results in a "direct drive" output wherein the output shaft 253 rotates at the same speed and with the same torque as the input shaft 250, but in the opposite direction. Again, the remaining annular members 217 and 219–222 must be free to rotate by maintaining prony brakes 241 and 243–246 released.

Various forward speeds are exemplified by locking either annular ring 219 or annular ring 220 so that the composite cone 270 will roll on either surface 233 or surface 234. Again, all other first annular members must be free to rotate by keeping the respective prony brakes disengaged. While only two reductions are shown, a designer may include as many reductions as his particular situation requires, the number of reductions being constrained by such things as the size of the speed-reduction unit and the stresses that the components of the unit must withstand. In the illustrated embodiment, it is seen that overdrive speeds occur above a selected angle, while speed reductions occur at angles less than the selected angle.

If it is desired to create a "park" condition, wherein the output shaft 253 has no output, while the input shaft 250 is rotating, then annular member 221 is locked against rotation by activating brake 245, with all other annular members being free to rotate. In this condition, the composite member 270 does not revolve around the axis 230 because it is rotating about the second axis 265 at the same speed that the input shaft 250 is rotating about the first axis 230. The output axis 253 is, therefore, locked against rotation with respect to the housing 201. It is seen that the slope of surface 235 is negative with respect to planes perpendicular to first axis 230.

In order to shift from the "park" condition into a "neutral" condition, wherein the output shaft 253 does not rotate at all in response to rotation of the input shaft 250, all one need do is release all of the brakes 241-246 so that all annular members 217-222 are free to rotate. In this condition, the output shaft 253 can be turned in either direction or not turned at all, since its motion is now virtually independent of the input shaft's rotation.

In order to reverse the drive, i.e. have the output shaft 253 rotate in the same direction as the input shaft 250 (for this particular case, we will assume that when the output shaft is rotating in the opposite direction of the input shaft, the vehicle is moving forward, and when it is rotated in the same direction, the vehicle is moving backward), one engages the prony brake 246 to arrest motion of the annular member 222. When in this condition, conical surface 236 is convex, when viewed from the apex point 240, while the conical surface 286 is concave. The shaft 253 then rotates in the same direction as the shaft 250 with an accompanying speed reduction, and the vehicle (not shown) in which the transmission 200 is mounted moves backward.

While the multi-speed drive 200 is particularly suitable for automotive vehicles, it should be kept in mind that the multi-speed drive 200 may be utilized for any other suitable purpose, such as driving pumps, marine craft, machine tools, etc.

The elegance of the instant invention may be appreciated by reference to the following trigonometric formula wherein:

$$R = \frac{\cos(\alpha + \gamma)}{\cos\alpha - \cos(\alpha + \gamma)};$$

R is the speed reduction ratio for a selected conical surface;

$\gamma$ is the angle that the second axis 265 makes with the first axis 230, and $\alpha$ is the angle that the conical surface makes with a plane which is perpendicular to the first axis 230.

By utilizing this formula, a designer first selects the desired speed reduction and then selects various values for $\alpha$ which will give him the desired speed reduction for a selected angle $\gamma$. In selecting the angle $\gamma$, design considerations may suggest that the angle should be 15°. ($\gamma$ can be whatever you want, but for purposes of illustration, 15° has been selected.) Using an angle $\gamma$ of 15°, a multi-speed transmission 200 might have the following speed reduction ratios which are achieved by inserting the following values in the aforementioned equation:

$$R = \frac{\cos(\alpha + 15°)}{\cos(\alpha) - \cos(\alpha + 15°)}$$

| Description of Speed Reduction | Desired Speed Reduction Ratio-R | $\alpha$ | $\gamma$ |
| --- | --- | --- | --- |
| 1. overdrive | ~+0.92:1 | +62° | 15° |
| 2. direct drive | ·+1:1 | +60° | 15° |
| 3. high speed reduction | ~+2.4:1 | +45° | 15° |
| 4. low speed reduction | ~+3.6:1 | +35° | 15° |
| 5. park | ~infinity | −7.5° | 15° |
| 6. reverse | ~−4.6:1 | −50° | 15° |

With the above-identified table, it is seen that the desired speed reduction is positive for all of the forward speeds and is negative for the reverse condition or reverse speed. Moreover, the desired speed reduction is infinity for the park situation and is one-to-one (1:1) for the direct drive situation. As a special case, the park condition always occurs when $\alpha$ equals minus one-half $\gamma$. In the illustrated situation, $\alpha$ is −7.5° and $\gamma$ is 15°.

While prony brakes are illustrated in the embodiment of FIGS. 4 and 5, and a pin brake is illustrated in the embodiment of FIG. 1, it should be kept in mind that any type of brake configuration or clutch configuration which will positively engage only one of the first cone surfaces 231-236 with its respective second conical surface 281-286 is sufficient for the purposes of this invention.

What is claimed is:

1. A multi-speed drive comprising:
   a supporting frame;
   an input shaft;
   means for mounting the input shaft for rotation with respect to the supporting frame about a first axis;
   a plurality of first members disposed about the first axis, the first members having conical surfaces thereon of different slopes with respect to the first axis, wherein the conical surfaces have apexes which are coincident at a single point, which point is coincident with the first axis;
   means for mounting the first members for rotation with respect to the frame;
   means for selectively stopping the first members individually;
   a second member having a plurality of second conical surfaces in individual engagement with the plurality of first conical surfaces along lines of contact, said second conical surfaces having apexes which are coincident with the apexes of the first conical surface;
   means for mounting the second member for rotation about a second axis which is oblique with respect to the first axis, said second axis being coincident with the apexes of the first and second conical surfaces and with the first axis;
   means for connecting the mounting means to the input shaft to rotate the mounting means about the first axis in a first direction, wherein the second conical surfaces revolve around the first axis as the second member rotates about the second axis, wherein one of the second conical surfaces rolls on whichever of the first members is stopped with respect to the frame with progressive line contact with respect thereto and without sliding motion with respect thereto;

an output shaft mounted for rotation in the frame, the output shaft being in alignment with the first axis;

a coupling having first and second ends, the first end being connected to the output shaft, and the second end being connected to the second member at a location in juxtaposition with the apexes of the conical surfaces thereon;

whereby, the second shaft has an output torque, speed and direction which is determined by whichever of the first members is stopped with respect to the frame by the stopping means.

2. The multi-speed drive of claim 1 wherein the angle ($\alpha$) that each line of contact makes with a plane normal to the first axis and the angle ($\gamma$) that the second axis makes with the first axis determine the ratio (R) of the input speed to the output speed for a selected first member in accordance with the formula:

$$R = \frac{\cos(\alpha + \gamma)}{\cos\alpha - \cos(\alpha + \gamma)}$$

whereby, when $R = \infty$ the transmission is in "park", when $R > 1$ the transmission has a reduced output speed with respect to the input speed, when $R = 1$ the transmission has an output speed equal to the input speed, when $-1 < R < 1$ the transmission has an output speed greater than the input speed, and when $R < 0$ the transmission is operating in reverse.

3. A multi-speed drive comprising: an input shaft and an output shaft aligned with one another on a first axis;

a plurality of first conical surfaces disposed around the first axis, said first conical surfaces having apecies coincident with the first axis;

a plurality of second conical surfaces secured to the input shaft and oriented for rotation about a second axis, which second axis is at an angle ($\gamma$) with respect to the first axis and intersects the first axis at a point of intersection; each of the second conical surfaces corresponding to a first conical surface and the second conical surfaces having apecies which are coincident with the first axis;

each of the first and the second conical surfaces having as a generatrix a radially extending straight line which intersects the first axis at a point and rotates about that point through 360° at a constant angle ($\alpha$) with respect to a plane normal to the first axis;

means for fixing a selected one of the first conical surfaces with respect to and in engagement with a corresponding second conical surface along a line of contact, which line of contact makes the angle ($\alpha$) with respect to the plane normal to the first axis, the line of contact being coincident with the point of intersection of the second axis with the first axis; whereby a single output speed is selected, and coupling means for connecting the second conical surfaces to the output shaft, whereby torque generated due to rotation of the input shaft is transmitted to the output shaft at a speed selected by the fixing means.

4. The multi-speed drive of claim 3 wherein the angle ($\alpha$) that the line of contact makes with the plane normal to the first axis and the angle ($\gamma$) that the second axis makes with the first axis determines a ratio (R) of the output speed, torque and direction with respect to the input speed, torque and direction for a selected first conical surface and corresponding second conical surface according to the formula:

$$R = \frac{\cos(\alpha + \gamma)}{\cos\alpha - \cos(\alpha + \gamma)}.$$

5. The multi-speed drive of claim 4 including first and second conical surfaces selectively associated with one another by the fixing means wherein the angles $\alpha$ and $\gamma$ are such that $R >$ absolute 1, whereby a speed reduction occurs between the input and output shafts.

6. The multi-speed drive of claim 4 including at least one first conical surface and a corresponding second conical surface selectively associated with one another by the fixing means wherein the angles $\alpha$ and $\gamma$ are such that R approaches "infinity" whereby a "park" condition occurs between the input and output shafts with the output shaft locked as the input shaft rotates.

7. The multi-speed drive of claim 6 wherein R is "infinity" when $\alpha$ equals minus one-half $\gamma$.

8. The multi-speed drive of claim 4 including at least one first conical surface and a corresponding second conical surface selectively associated with one another by the fixing means wherein the angles $\alpha$ and $\gamma$ are such that $R <$ absolute 1 whereby a speed increase occurs between the input and output shafts resulting in an "overdrive" mode of operation for the drive.

9. The multi-speed drive of claim 4 including at least one first conical surface and a corresponding second conical surface selectively associated with one another by the fixing means wherein the angles $\alpha$ and $\gamma$ are such that R changes sign and the output shaft rotates in the opposite direction, thereby providing a "reverse" mode of operation for the mechanism.

10. The multi-speed drive of claim 1 wherein the angle ($\gamma$) that the second axis makes with the first axis is fixed for a respective design of the drive and wherein the angle ($\alpha$) that each line of contact makes with a plane extending perpendicular to the first axis determines the speed reduction ratio in accordance with the formula:

$$R = \frac{\cos(\alpha + \gamma)}{\cos\alpha - \cos(\alpha + \gamma)}.$$

* * * * *